United States Patent
Krebs

(10) Patent No.: US 7,568,255 B1
(45) Date of Patent: Aug. 4, 2009

(54) THERMAL STORAGE BARE SURFACE CLEANER

(75) Inventor: Alan J. Krebs, Pierson, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 870 days.

(21) Appl. No.: 10/708,132

(22) Filed: Feb. 9, 2004

Related U.S. Application Data

(60) Provisional application No. 60/319,932, filed on Feb. 10, 2003.

(51) Int. Cl.
*A47L 13/20* (2006.01)

(52) U.S. Cl. .......... 15/104.93; 15/231; 15/228; 15/209.1; 219/227

(58) Field of Classification Search .......... 15/228, 15/231, 209.1, 210.1, 104.93; 219/221, 227
See application file for complete search history.

(56) References Cited

U.S. PATENT DOCUMENTS

| | | | |
|---|---|---|---|
| 3,099,855 A | | 8/1963 | Nash |
| 4,106,153 A | * | 8/1978 | Lemelson .......... 15/231 |
| 4,604,987 A | * | 8/1986 | Keltner .......... 126/204 |
| 4,971,471 A | * | 11/1990 | Sloan .......... 401/203 |
| 5,424,519 A | | 6/1995 | Salee |
| 5,456,701 A | | 10/1995 | Stout |
| 6,131,237 A | | 10/2000 | Kasper |
| 6,305,046 B1 | | 10/2001 | Kingry et al. |
| 6,925,675 B1 | * | 8/2005 | Trunecek .......... 15/236.02 |
| 7,022,945 B1 | * | 4/2006 | Western .......... 219/386 |
| 2003/0075203 A1 | | 4/2003 | Hansen et al. |
| 2007/0079470 A1 | * | 4/2007 | Rippl et al. .......... 15/320 |

* cited by examiner

*Primary Examiner*—Gary K Graham
(74) *Attorney, Agent, or Firm*—McGarry Bair PC

(57) ABSTRACT

A thermal storage bare surface cleaner comprises a cleaning implement wrapped over a cleaning head and positioned between the cleaning head and the surface to be cleaned. The cleaning head comprises a thermal storage body for absorbing heat and releasing the heat over an extended period of time. The released heat warms the cleaning implement and enhances the cleaning performance thereof. The cleaning head be removably mounted to an upright handle for cleaning bare floors.

26 Claims, 4 Drawing Sheets

THERMAL STORAGE BARE SURFACE CLEANER

CROSS REFERENCE TO RELATED APPLICATIONS

This application claims the benefit of U.S. Patent Application Ser. No. 60/319,932, filed Feb. 10, 2003.

BACKGROUND OF INVENTION

1. Field of the Invention

This invention relates to cleaning implements, and more particularly, to a hard surface cleaner. In one of its aspects, the invention relates to a cleaner with a thermal storage media for heated cleaning of a surface. In another of its aspects, the invention relates to a surface cleaning implement that can be heated by microwave energy. In another of its aspects, the invention relates to a method of cleaning a surface. In another of its aspects, the invention relates to a bare floor cleaner.

2. Description of the Related Art

Microwaveable thermal storage units that absorb heat and then release that heat over time comprise a liquid phase of a microwave active fluid and a solid phase suspended within the microwave active fluid. The solid phase is preferably selected from material having a melting point at or below a temperature to which the liquid phase is heated. Once activated, the thermal energy contained therein is released over an extended period of time. One such example of a microwave-activated thermal storage material is described in U.S. Pat. No. 5,424,519 to Salee.

Dust mops utilizing wet or dry sheet cleaning implements are also known. U.S. Pat. Nos. 3,099,855 to Nash, issued Aug. 6, 1963, and 6,305,046 to Kingry et al., issued Oct. 23, 2001, disclose a cleaning implement comprising a panel-shaped head with an attached handle and a removable cleaning cloth. An example of such a cleaning cloth is described in U.S. Pat. No. 5,525,397 to Sizuno. A resilient foam pad may be attached to the head to provide a cushioned surface against which the cleaning cloth is supported. Wet cloths comprising a web of specially designed fibers impregnated with proprietary floor cleaners and polishers are removably attached to the head or foam pad.

It is generally accepted that heat enhances the dissolution of water soluble materials. Steam generating mops are commercially available under the EnviroSteamer brand from the Eureka Company. A hot water extraction machine is disclosed in U.S. Pat. No. 6,131,237 to Kasper.

SUMMARY OF INVENTION

A bare floor cleaner according to the invention comprises a cleaning head; an upright handle pivotally mounted to the cleaning head, a cleaning implement associated with the cleaning head and adapted to move along a surface to be cleaned; and a thermal storage body associated with the cleaning head and adjacent to the cleaning implement, wherein the thermal storage body is adapted to store thermal energy and to release the stored thermal energy over an extended period of time to the cleaning implement.

The thermal storage body can comprise at least one component that carries out an exothermic process to release the thermal energy. The at least one component can undergo a phase change during the exothermic process. The exothermic process can be an exothermic chemical reaction. The exothermic process is typically reversible so that the thermal storage body can be reused.

The thermal storage body can comprise a gel.

The cleaning head can include a resilient pad. The resilient pad can be positioned between the thermal storage body and the cleaning implement. The cleaning implement comprises a cleaning cloth.

The thermal storage body can be removably mounted to the upright handle for placement in a heating device. The thermal storage body can be removably mounted to the cleaning head for placement in a heating device. The thermal storage body can be directly adjacent the cleaning implement.

In one embodiment, the thermal storage body includes at least one component that is microwave active and the thermal storage body is encapsulated by a resilient pad. The thermal storage body can be a liquid phase of a heat active fluid and a solid phase suspended in the liquid phase. The heat active fluid is adapted to absorb microwave energy. The solid phase undergoes a phase change. The liquid phase comprises a water and alcohol mixture and the solid phase comprises an organic wax with a melting point of at least 30° C. but no greater than 65° C. The melting point of the organic wax can be within a range of 53° C. to 57° C.

In a further embodiment of the invention, the thermal storage body can include a mechanical re-emulsifier.

In another embodiment, the bare floor cleaner can further include a resilient pad positioned between the thermal storage body and the cleaning implement, wherein the resilient pad is porous to thermal energy, which can pass from the thermal storage body to the cleaning implement over an extended period of time.

In yet another embodiment, the upright handle is removable from the cleaning head whereby the cleaning head can be manipulated by hand to clean a hard surface.

Further according to the invention, a hard surface cleaner comprises a cleaning head; a cleaning implement associated with the cleaning head and adapted to move along a surface to be cleaned; and a thermal storage body associated with the cleaning head and adjacent to the cleaning implement, wherein the thermal storage body is adapted to store thermal energy and to release the stored thermal energy over an extended period of time to the cleaning implement. Still further according to the invention, a method of cleaning a bare surface comprises the steps of heating a thermal storage body with a heating device to impart thermal energy to the thermal storage body; mounting the thermal storage body in heat transfer relationship with a bare surface cleaning implement; and moving the cleaning implement across the surface to be cleaned while transferring heat from the thermal storage body to the bare surface.

Still further according to the inventions, a method of cleaning a surface comprises the steps of initiating an exothermic reaction within a thermal storage body; mounting the thermal storage body to a bare surface cleaning implement; and moving the bare surface cleaning implement across the surface to be cleaned while transferring heat from the thermal storage body to the bare surface cleaning implement.

DETAILED DESCRIPTION

Figure 1:
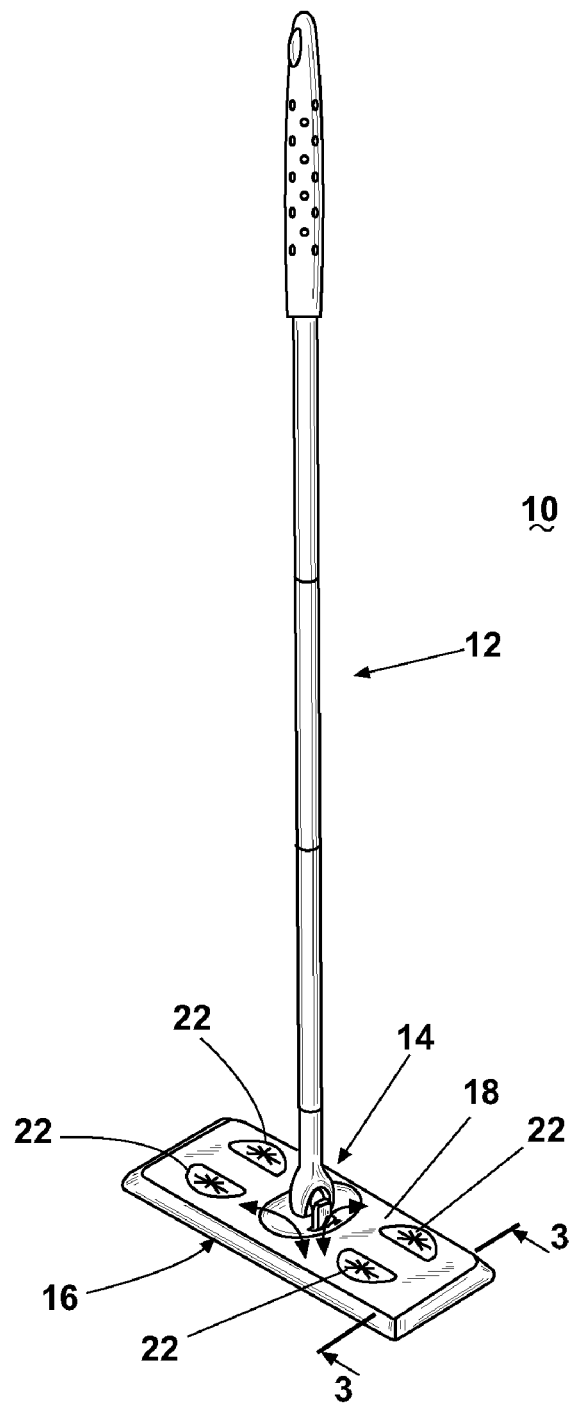
FIG. 1 is a perspective view of a thermal storage bare floor cleaner according to the invention and comprising a cleaning head and a handle.
Figure 2:
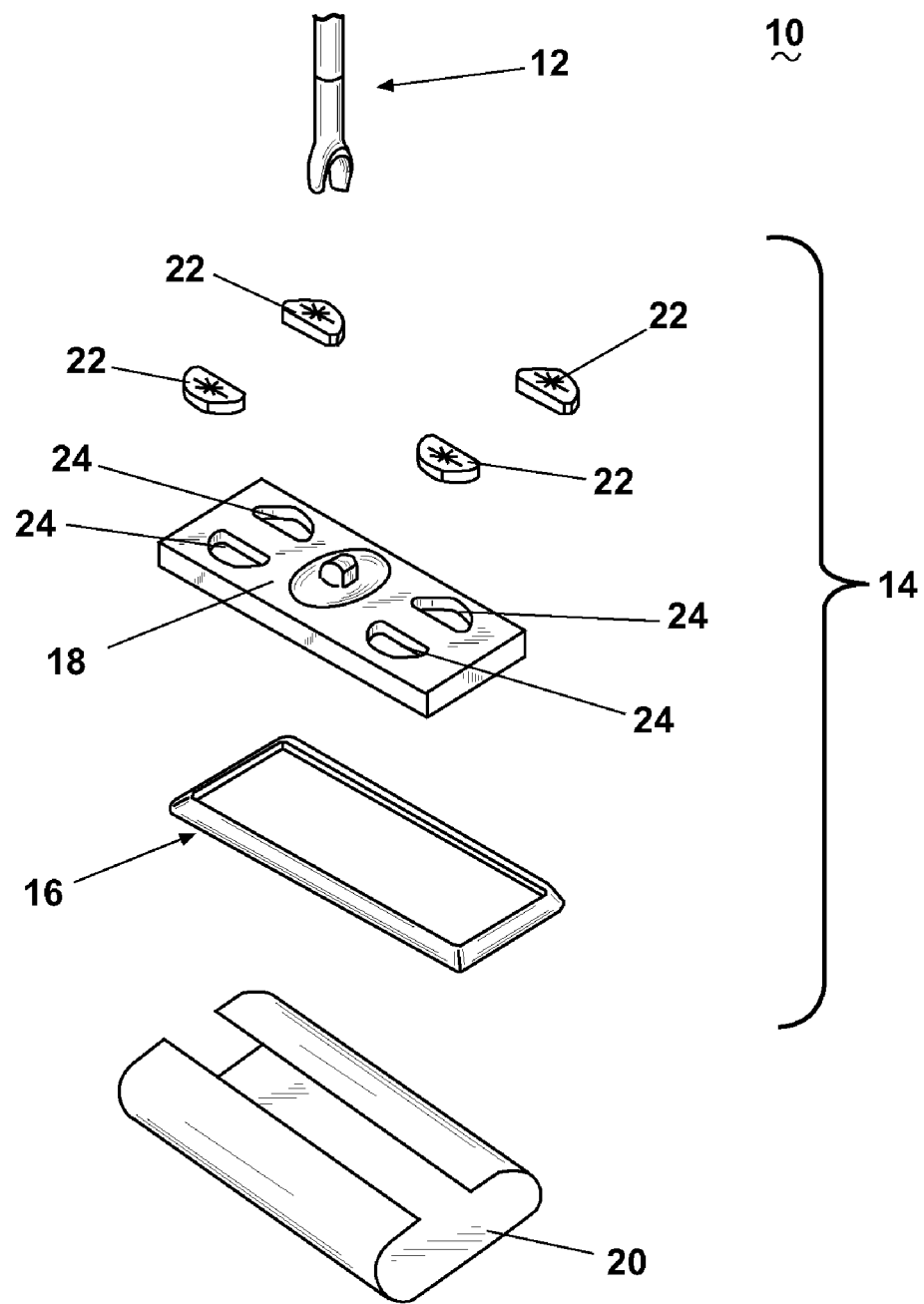
FIG. 2 is an exploded perspective view of the cleaning head shown in FIG. 1 and including a cleaning cloth.

Referring to the drawings and to FIGS. 1 and 2 in particular, a stick-type bare floor cleaner 10 comprises an upright handle 12 pivotally attached to a removable cleaning head 14. The cleaning head 14 further comprises a thermal pad assembly 16 attached to a cleaning head structure 18. A cleaning implement 20 (FIG. 2) is removably attached to the cleaning head structure 18. The cleaning head structure 18 is generally block shaped and formed of a material that can withstand temperatures in excess of 90° C. without deforming or losing strength. In the preferred embodiment, the thermal pad assembly 16 is bonded directly to the cleaning head structure 18 with a commonly known adhesive. The cleaning head 14 is removable from the upright handle 12 and can be placed in a heating device, such as a microwave oven. Alternatively, the thermal pad assembly 16 is removably attached to the cleaning head structure 18 for placement in the heating device. In such an embodiment, a concave ridge extending around a perimeter of the cleaning head structure 18 removably mates with a corresponding concave trough formed on the mating surface of the thermal foam pad assembly 16 to provide a friction fit. Alternatively, the thermal pad assembly 16 is removably attached to the cleaning head structure 18 via commonly known hook and loop fabric fasteners.

The cleaning implement 20 can be any of several well-known objects for cleaning floors. For example, the cleaning implement 20 can be a foam pad, sponge, a dust mop, an abrasive pad, or a cloth. Preferably, the cleaning implement 20 is a cleaning cloth. The cleaning cloth 20 can be a wide range of fabrics that are adapted for cleaning bare floors. The fabrics can be dry or impregnated with a liquid cleaner and/or a polisher. Examples of suitable cleaning cloths are disclosed in U.S. Pat. Nos. 3,099,855 to Nash; 6,305,046 to Kingry et al.; and 5,525,397 to Chizuno, which are incorporate herein by reference in their entirety.

A plurality of cloth retainers 22 is located on an upper surface of the cleaning head structure 18. The cloth retainers 22 are generally oval-shaped bodies adapted to be fixedly retained in a corresponding cloth retainer seat 24 located on an upper surface of the cleaning head structure 18. Examples of such cloth retainers are disclosed in U.S. Pat. Nos. 3,099,855 to Nash, and 6,305,046 to Kingry et al., which are incorporated herein by reference in their entirety. The cloth retainers 22 are provided with a plurality of radially extending slits in a spoke-like pattern to form a plurality of triangular shaped, deformable flaps for holding a portion of the cleaning cloth 20. It will be evident that the cloth retainers 22 can be any suitable shape, such as circular or triangular, so long as a suitable number of slits and flaps are provided to securely hold the cleaning cloth 20 in place.

Figure 3:
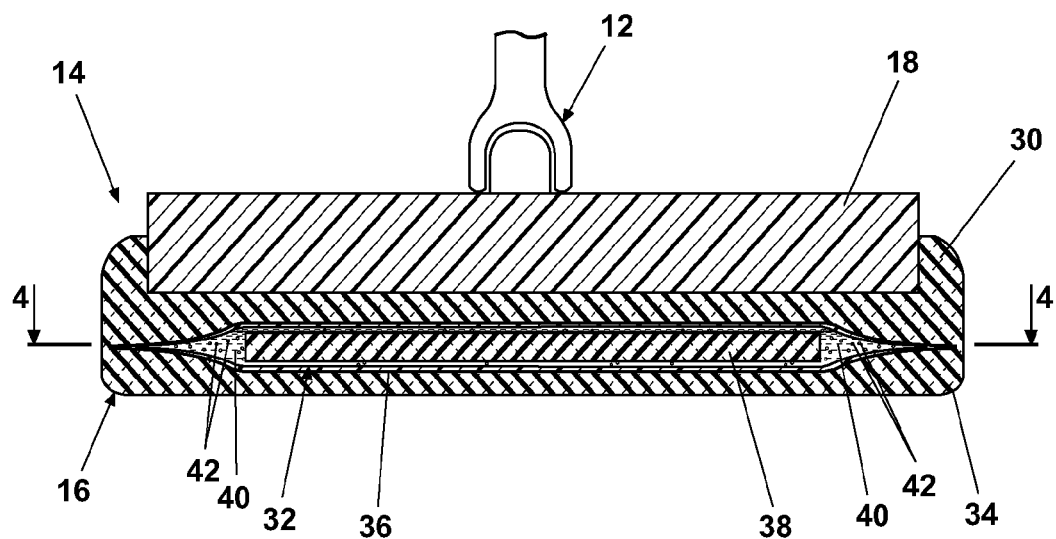
FIG. 3 is a sectional view of the cleaning head taken along line 3-3 of FIG. 1.
Figure 4:
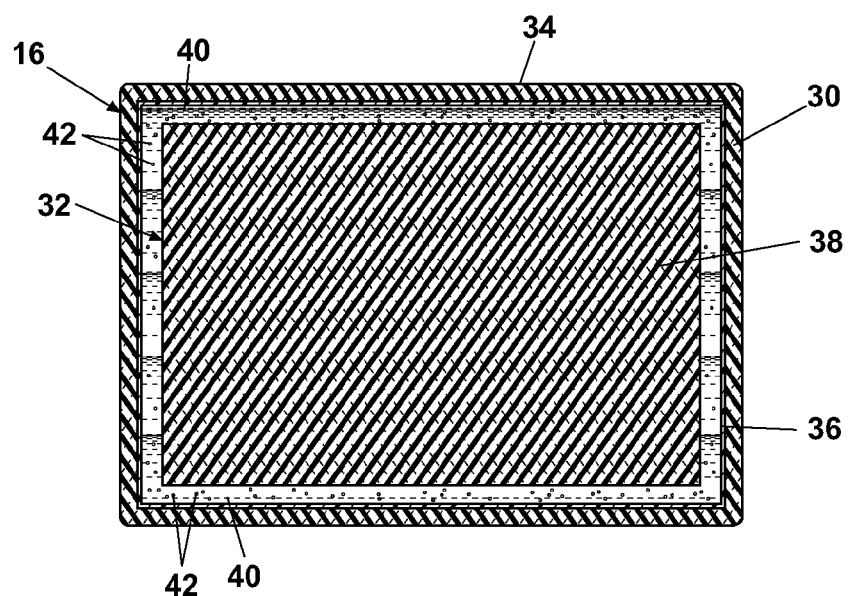
FIG. 4. is a sectional view taken along line 4-4 of FIG. 3.

Referring to FIGS. 3 and 4, the thermal pad assembly 16, which is preferably resilient, comprises a foam pad 30 and a thermal storage body 32 located within the foam pad 30. The foam pad 30 is preferably made of closed cell polyurethane foam enclosed in an outer skin 34. A slit in the foam pad 30 creates a chamber in which the thermal storage body 32 resides. After the thermal storage body 32 is inserted, the outer edge of the slit is sealed to trap the thermal storage body 32 inside.

The thermal storage body 32 is adapted to store heat from an external source and release the heat to its environment over an extended period of time. Alternatively, the thermal storage body 32 can generate its own heat without assistance from the external source. For example, the thermal storage body 32 can comprise means for initiating and maintaining an exothermic process, such as an exothermic chemical reaction. Further, the thermal storage body 32 can be heated by a combination of the external source and internal generation. Regardless of the manner in which heat is imparted to the thermal storage body 32, the heat is dissipated therefrom and transferred to the cleaning cloth 20 at a rate that is fast enough for sufficiently heating the cleaning cloth 20 yet slow enough to ensure that the cleaning cloth 20 remains sufficiently heated during use.

In the preferred embodiment, the thermal storage body 32 includes at least one component that is heat active, and preferably microwave active. Suitable microwave-activated thermal storage material is disclosed in the Salee U.S. Pat. No. 5,424,519, which is incorporated herein by reference in its entirety. In the preferred embodiment, the thermal storage body 32 comprises an outer bag 36 containing a matrix 38, a liquid phase 40 of a heat active fluid, and a solid phase 42 suspended or otherwise dispersed within the liquid phase 40 to form a suspension or an emulsion. The matrix 38 is formed of a structure that carries or contains the liquid and solid phases 40 and 42. Both the liquid phase 40 and the solid phase 42 are impregnated within the matrix 38. Further, the matrix 38 can function as a mechanical re-emulsifier. If the liquid and solid phases 40 and 42 separate, then ordinary mechanical manipulation, such as squeezing, bending, or folding, of the matrix 38 will re-emulsify the liquid and solid phases 40 and 42. An exemplary matrix is an open cell foam structure, preferably made of flexible polyurethane. Alternate materials for the matrix 38 include sponge rubber or natural sponge.

The heat active liquid phase 40 absorbs heat from the external source. For example, the liquid phase 40 can absorb microwave energy from a conventional microwave oven. The solid phase 42 heats up and melts by thermal transfer from the liquid phase 40. In the preferred embodiment, the liquid phase 40 comprises a water and alcohol mixture, and the solid phase 42 comprises an organic wax with a melting point that is at least as high as the temperature to which the liquid phase 40 is heated. Preferably, the melting point of the solid phase 42 is at least 30° C. but no greater than 65° C. and is preferably within a range of 53° C. to 57° C. The resilient thermal foam pad 30 is thermally porous for passage of the thermal energy from the thermal storage body 32 to the cleaning cloth 20 over an extended period of time.

Other examples of suitable microwave-activated thermal storage material are disclosed in U.S. Pat. No. 5,456,701 to Stout, which is incorporated herein by reference in its entirety. Such thermal storage material is in gel form and includes a water soluble humectant entrapped within a polymeric matrix. A preferable humectant is in the form of glycerin, and the polymeric matrix is most preferably formed of acrylamide. Other components of the thermal storage material include a cross-linking agent, citric acid, ammonium persulfate, and water. This thermal storage material can be heated in a device, such as a microwave, and releases heat over a long period of time. In this embodiment, the thermal storage material is preferably contained in an outer bag to form the thermal storage body 32 that is received within the foam pad 30.

In an alternate embodiment, the thermal storage body 32 is placed in a cavity formed in the cleaning cloth 20 in the same or similar manner as described above for the foam pad 30. The foam pad 30 and cleaning head 14 remain attached to the upright handle 12. Only the cleaning cloth 20 is placed in the microwave oven for heating. Once heated, the cleaning cloth 20 is attached as described below.

In an alternative embodiment, the thermal storage body 32 comprises a reactant and an activator, wherein actuation of the activator initiates an exothermic chemical reaction involving the reactant within the thermal storage body 32. Heat from the exothermic reaction is transferred from the thermal storage body 32 to the cleaning cloth 20. An exemplary exothermic reaction system is disclosed in U.S. patent application Ser.

No. 10/065,480 Hansen et al., which is incorporated herein by reference in its entirety. The exothermic reaction system comprises an aqueous sodium acetate solution and a metallic activation strip. When the activation strip is flexed, the aqueous sodium acetate solution crystallizes exothermically. After use, the sodium acetate can be returned to its liquid state by heating the thermal storage body 32. As the sodium acetate cools, it remains in a supercooled liquid state, thereby storing energy that it can release when the activation strip is flexed during the next use of the thermal storage body 32. Another example of an exothermic reaction system is a mixture of iron powder, water, salt, activated carbon, and vermiculite. The mixture is contained within a porous pouch that is sealed in an airtight package. When the package is opened, the mixture becomes exposed to air, which is the activator, and undergoes an exothermic reaction. In particular, the air oxidizes the iron power, and some of the other components in the mixture catalyze the reaction. When used with the bare floor cleaner 10, the porous pouch is removed from the airtight package shortly before use. The thermal storage body 32 of this alternative embodiment can be coupled to the bare floor cleaner 10 in the same manners as described above.

An exemplary description of the operation of the bare floor cleaner 10 follows. It will be apparent to one of ordinary skill in the floor cleaner art that the operating steps can transpire in any logical order and are not limited to the sequence presented below. The following description is for illustrative purposes only and is not intended to limit the invention in any manner.

Figure 5:
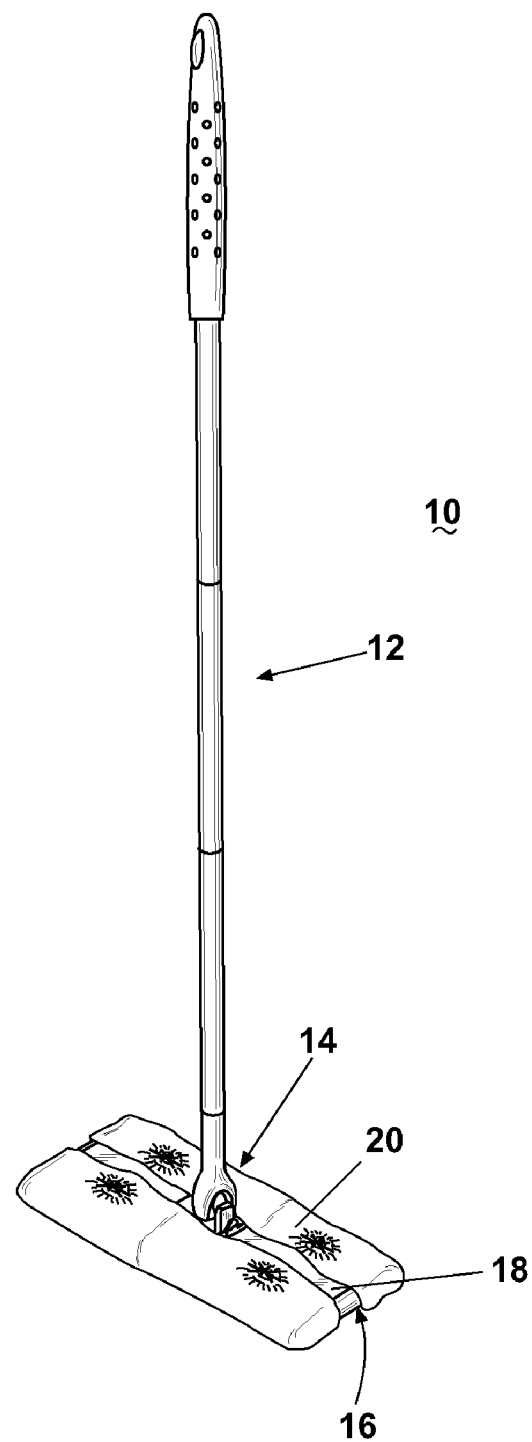
FIG. 5 is a perspective view of the thermal storage bare floor cleaner shown in FIG. 1 with the cleaning cloth attached.

In operation, the cleaning head 14 is removed from the upright handle 12. The cleaning head 14 is placed in a suitable microwave oven and exposed to microwaves for a suitable period of time, for example in the range of about 2 to 5 minutes, for effective heat transfer to the thermal storage body 32. Heat absorbed by the liquid phase 40 is transferred to the solid phase 42, which subsequently melts. When the thermal storage body 32 is sufficiently heated, the cleaning head 14 is reattached to the upright handle 12. Referring to FIG. 5, the cleaning cloth 20 is attached to the cleaning head 14 by inserting two corners of the cleaning cloth 20 in a first pair of cloth retainers 22. The cleaning cloth 20 is wrapped around the cleaning head 14, and the two remaining corners of the cleaning cloth 20 are then inserted into the second pair of cloth retainers 22 to retain the cleaning cloth 20 in place.

Once the bare floor cleaner 10 with the heated thermal storage body 32 is assembled, a user moves the bare floor cleaner 10 across the surface to be cleaned. The cleaning cloth 20 picks up dust and debris as it moves across the surface. As the thermal storage body 32 cools, it releases heat to the cleaning cloth 20 during three periods of cooling: a period of sensible heat loss above the melting point of the solid phase 42, a period of latent heat loss during the phase change, which is an exothermic process, of the solid phase 42 from liquid back to solid, and another sensible heat loss period below the melting point of the solid phase 42. The cleaning activity of the bare floor cleaner 10 is enhanced by the heat that is transferred from the thermal storage body 32 to the cleaning cloth 20 and the optional liquid cleaner contained therein. The heat is transferred to the cleaning cloth 20 over an extended period of time. If the heat dissipates from the thermal storage body 32 such that it no longer effectively heats the cleaning cloth 20, the cleaning head 14 can be removed from the upright handle 12 and reheated in the same manner as described above. At any time, the thermal storage body 32 can be mechanically agitated to re-emulsify the liquid and solid phases 40 and 42.

Alternate heat sources may also be used to impart thermal energy to the thermal storage mixture. Such sources comprise conventional electric or gas ovens, electric range coils, heat generated during exothermic chemical reactions, solar absorption, and forced air gas fired furnaces.

The cleaning head 14 can be adapted for use without the upright handle 12. For example, the cleaning head 14 can be removed from the upright handle 12 and utilized to clean other hard surfaces, such as windows, walls, shelves, or countertops. As illustrated in FIG. 2, the handle 12 is removably mounted to the cleaning head 14 through a removable clevis mounting. A user can grasp the cleaning head 14 and direct it by hand across the surface to be cleaned. Alternatively, the cleaning head 14 can be supplied as an individual unit without the upright handle 12.

Reasonable variation and modification are possible within the forgoing disclosure and drawings without departing from the spirit of the invention, which is defined in the appended claims.

The invention claimed is:

1. The bare floor cleaner comprising:
a cleaning head;
an upright handle pivotally mounted to the cleaning head so that a user can grasp the handle and move the cleaning head across the surface to be cleaned from an upright position;
a liquid impregnated cleaning implement associated with the cleaning head and adapted to move along a surface to be cleaned; and
a self-contained thermal storage body associated with the cleaning head and adjacent to the cleaning implement the thermal storage body being adapted to store thermal energy and to release the stored thermal energy over an extended period of time to the cleaning implement and comprising at least one component that carries out an exothermic process to release the thermal energy;
wherein the at least one component undergoes a phase change during the exothermic process.

2. The bare floor cleaner of comprising:
a cleaning head;
an upright handle pivotally mounted to the cleaning head so that a user can grasp the handle and move the cleaning head across the surface to be cleaned from an upright position;
a liquid impregnated cleaning implement associated with the cleaning head and adapted to move along a surface to be cleaned; and
a self-contained thermal storage body associated with the cleaning head and adjacent to the cleaning implement, the thermal storage body being adapted to store thermal energy and to release the stored thermal energy over an extended period of time to the cleaning implement and comprising at least one component that carries out an exothermic process to release the thermal energy;
wherein the exothermic process is an exothermic chemical reaction.

3. The bare floor cleaner comprising:
a cleaning head;
an upright handle pivotally mounted to the cleaning head so that a user can grasp the handle and move the cleaning head across the surface to be cleaned from an upright position;
a liquid impregnated cleaning implement associated with the cleaning head and adapted to move along a surface to be cleaned; and
a self-contained thermal storage body associated with the cleaning head and adjacent to the cleaning implement, the thermal storage body being adapted to store thermal energy and to release the stored thermal energy over an extended period of time to the cleaning implement and comprising at least one component that carries out an exothermic process to release the thermal energy;

wherein the exothermic process is reversible and the thermal storage body can be reused.

4. The bare floor cleaner according to claim 3 wherein the thermal storage body comprises a resilient pad.

5. The bare floor cleaner according to claim 3 and further comprising a resilient pad and the resilient pad is positioned between the thermal storage body and the cleaning implement.

6. The bare floor cleaner according to claim 3 wherein the cleaning implement comprises a cleaning cloth.

7. The bare floor cleaner according to claim 3 wherein the thermal storage body is removably mounted to the upright handle for placement in a heating device.

8. The bare floor cleaner according to claim 7 wherein the thermal storage body is removably mounted to the cleaning head for placement in a heating device.

9. The bare floor cleaner according to claim 3 wherein the thermal storage body is directly adjacent the cleaning implement.

10. The bare floor cleaner according to claim 3 wherein the at least one component that is microwave active and the thermal storage body is encapsulated by a resilient pad.

11. The bare floor cleaner according to claim 3 wherein the upright handle is removably mounted to the cleaning head whereby the cleaning head can be manipulated by hand to clean a hard surface without the handle.

12. The bare floor cleaner according to claim 3 wherein the thermal storage body comprises a gel.

13. The bare floor cleaner according to claim 3 wherein the liquid impregnated into the cleaning implement comprises at least one of a liquid cleaner and a polisher.

14. A bare floor cleaner comprising:
a cleaning head;
an upright handle pivotally mounted to the cleaning head so that a user can grasp the handle and move the cleaning head across the surface to be cleaned from an upright position;
a liquid impregnated cleaning implement associated with the cleaning head and adapted to move along a surface to be cleaned; and
a thermal storage body associated with the cleaning head and adjacent to the cleaning implement, the thermal storage body being adapted to store thermal energy and to release the stored thermal energy over an extended period of time to the cleaning implement and comprising a liquid phase of a heat active fluid and a solid phase suspended in the liquid phase.

15. The bare floor cleaner according to claim 14 wherein the heat active fluid is adapted to absorb microwave energy.

16. The bare floor cleaner according to claim 15 wherein the solid phase undergoes a phase change.

17. The bare floor cleaner according to claim 16 wherein the liquid phase comprises a water and alcohol mixture and the solid phase comprises an organic wax with a melting point of at least 30° C. but no greater than 65° C.

18. The bare floor cleaner according to claim 17 wherein the melting point of the organic wax is within a range of 53° C. to 57° C.

19. The bare floor cleaner according to claim 14 wherein the thermal storage body further comprises a mechanical re-emulsifier.

20. The bare floor cleaner according to claim 14 and further comprising a resilient pad positioned between the thermal storage body and the cleaning implement and wherein the resilient pad is porous to thermal energy which can pass from the thermal storage body to the cleaning implement over an extended period of time.

21. The bare floor cleaner according to claim 14 wherein the liquid impregnated into the cleaning implement comprises at least one of a liquid cleaner and a polisher.

22. The hard surface cleaner comprising:
a cleaning head;
a liquid impregnated cleaning implement associated with the cleaning head and adapted to move along a surface to be cleaned; and
a self-contained thermal storage body associated with the cleaning head and adjacent to the cleaning implement, the thermal storage body being adapted to store thermal energy and to release the stored thermal energy over an extended period of time to the cleaning implement and comprising at least one component that carries out an exothermic process to release the thermal energy;
wherein the at least one component undergoes a phase change during the exothermic process.

23. The hard surface cleaner comprising:
a cleaning head;
a liquid impregnated cleaning implement associated with the cleaning head and adapted to move along a surface to be cleaned; and
a self-contained thermal storage body associated with the cleaning head and adjacent to the cleaning implement, the thermal storage body being adapted to store thermal energy and to release the stored thermal energy over an extended period of time to the cleaning implement and comprising at least one component that carries out an exothermic process to release the thermal energy;
wherein the exothermic process is an exothermic chemical reaction.

24. The hard surface cleaner comprising:
a cleaning head;
a liquid impregnated cleaning implement associated with the cleaning head and adapted to move along a surface to be cleaned; and
a self-contained thermal storage body associated with the cleaning head and adjacent to the cleaning implement, the thermal storage body being adapted to store thermal energy and to release the stored thermal energy over an extended period of time to the cleaning implement and comprising at least one component that carries out an exothermic process to release the thermal energy;
wherein the thermal storage body comprises a liquid phase of a heat active fluid and a solid phase suspended in the liquid phase.

25. The hard surface cleaner according to claim 24 wherein the solid phase undergoes a phase change during the exothermic process.

26. The hard surface cleaner according to claim 24 wherein the liquid impregnated into the cleaning implement comprises at least one of a liquid cleaner and a polisher.

* * * * *

UNITED STATES PATENT AND TRADEMARK OFFICE
CERTIFICATE OF CORRECTION

PATENT NO. : 7,568,255 B1  Page 1 of 1
APPLICATION NO. : 10/708132
DATED : August 4, 2009
INVENTOR(S) : Alan J. Krebs It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1541 days.

Signed and Sealed this

Seventh Day of September, 2010

David J. Kappos
*Director of the United States Patent and Trademark Office*